Nov. 9, 1971  E. R. SHULL ET AL  3,618,376
MULTIAXIAL LOAD CELL
Filed Dec. 19, 1969  2 Sheets-Sheet 2
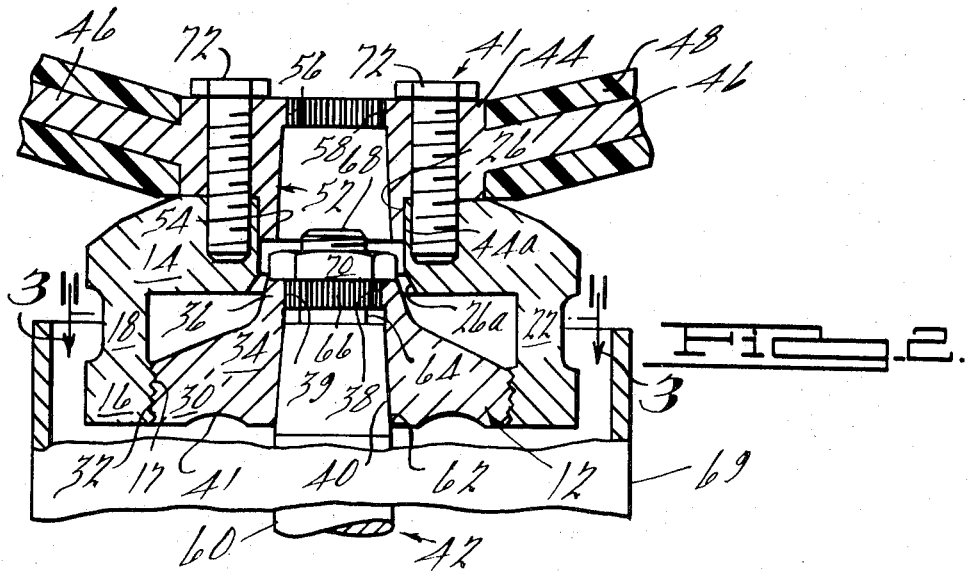
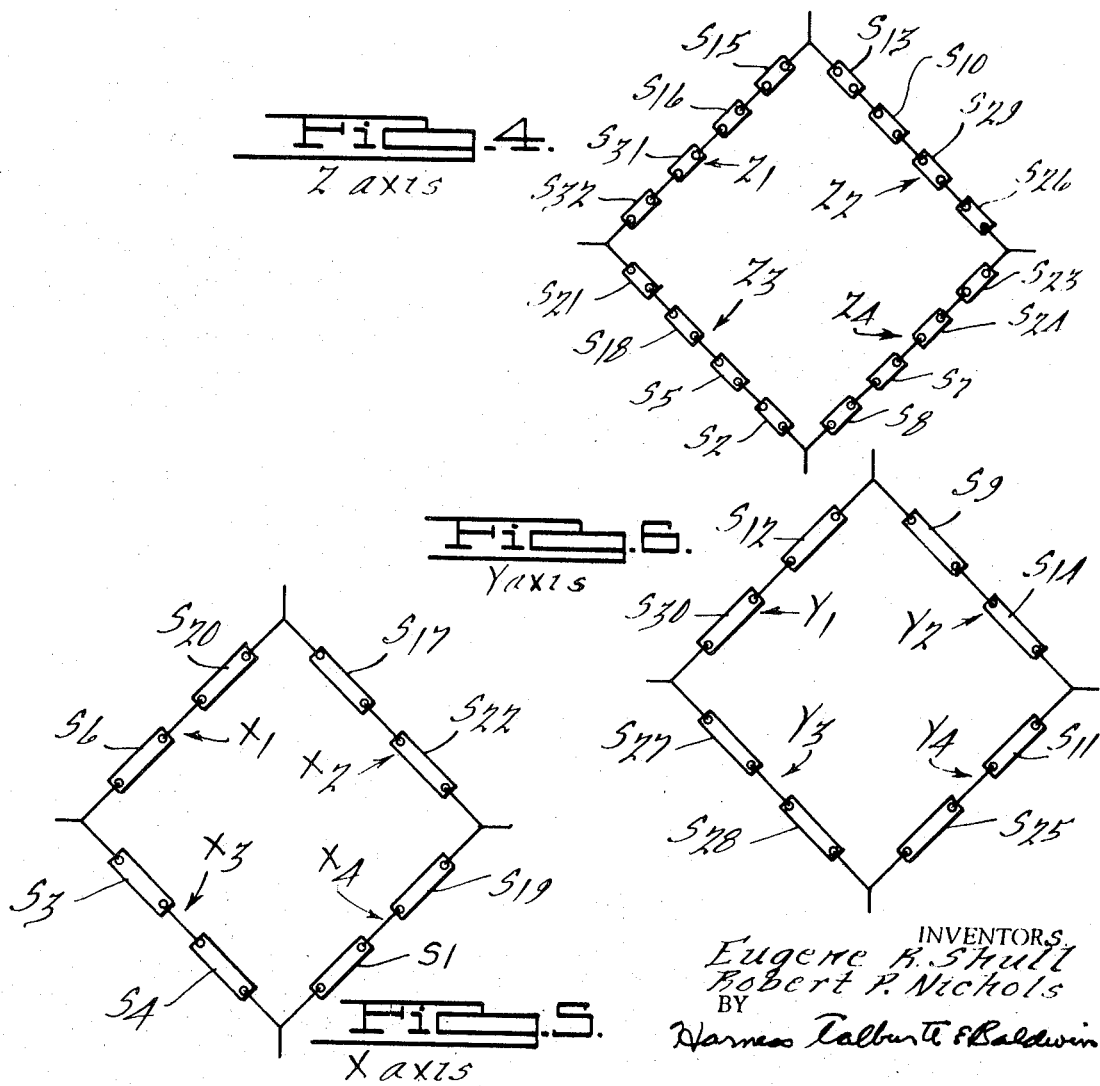
INVENTORS
Eugene R. Shull
Robert P. Nichols
BY
Harness Talburtt & Baldwin
ATTORNEYS

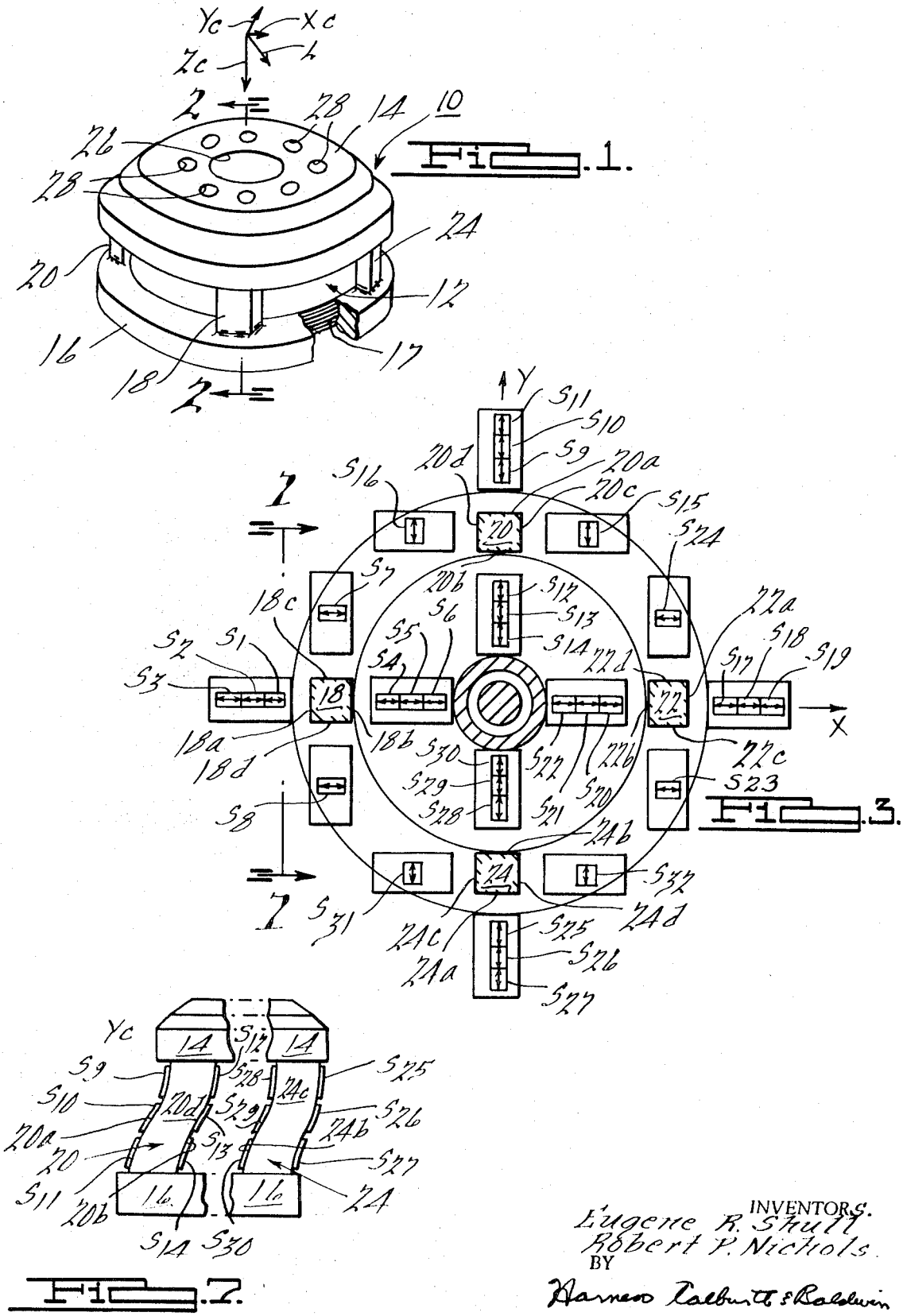

United States Patent Office 3,618,376
Patented Nov. 9, 1971

3,618,376
MULTIAXIAL LOAD CELL
Eugene R. Shull, Detroit, and Robert P. Nichols, Mount Clemens, Mich., assignors to Chrysler Corporation, Highland Park, Mich.
Filed Dec. 19, 1969, Ser. No. 886,610
Int. Cl. G01l 5/16
U.S. Cl. 73—133                                                11 Claims

ABSTRACT OF THE DISCLOSURE

A triaxial load cell comprising a upper load receiving platform portion of generally disc shape, a lower internally threaded rim portion, a plurality of circumferentially spaced column portions of square cross section integrally interconnecting the outer periphery of the upper platform portion and the rim portion, an insert member threadably received within the rim portion, and a plurality of strain gages secured to the side faces of the column portions. The invention cell, when used in impact testing of automotive steering columns, is interposed between the hub of the steering wheel and the steering column shaft with the steering wheel hub threadably secured to the upper face of the platform portion and the usual external splines on the upper end of the steering column shaft engaging with internal splines on the transducer insert member.

BACKGROUND OF INVENTION

This invention relates to load cells or load transducers and, more particularly, to load cells capable of measuring more than one axial component of an imposed load. Such multiaxial load cells are useful, for example, in measuring the axial load components generated in automotive steering column impact tests. Although many multiaxial load cells are presently available, none are entirely satisfactory for steering column impact testing.

SUMMARY OF INVENTION

The primary object of the present invention is to provide an improved multiaxial load cell, and more particularly, to provide a load cell especially suited for use in steering column impact testing.

The load cell of the invention comprises a unitary load receiving member having a central axis disposed in working position generally parallel to the direction of the load to be received. The load receiving member comprises an upper load receiving portion sysmmetrically arranged about the central load cell axis, a lower base portion symmetrically arranged about the central load cell axis and spaced downwardly from the upper portion, and a plurality of column portions extending generally parallel to the central load cell axis and integrally interconnecting the upper and lower portions. The column portions are arranged in circumferentially spaced relation about the load cell axis and integrally connect at their upper ends to a radially outer portion of the upper load member portion to define a central section of the upper portion within, and circumscribed by, the column portions. Threaded hole means are provided in this central section of the upper portion for use in fastening a first test member (a steering wheel hub, for example) to the upper portion, and threaded bore means are provided in the lower base portion for use in fastening a second test member (a steering column shaft, for example) to the lower portion. Strain gage means are secured to at least some of the side faces of the column portions and these strain gage means are connected into Wheatstone Bridge means to provide one or more readout signals at the Wheatstone bridge means in response to imposition of a load on the upper portion of the load receiving member.

In the disclosed embodiment of the invention, the lower base portion of the load receiving member comprises an interiorly threaded rim and a threaded insert is received within the rim portion to facilitate fastening of the steering column shaft.

The column portions in the disclosed embodiment have a generally rectangular cross section and are arranged in a circular pattern with the inner and outer faces of each column portion disposed generally normal to a radius of the pattern circle, and at least one strain gage is secured to the inner or outer face of each column portion with each such strain gage oriented on the column portion face in a direction parallel to the central load member axis.

Other objects, features and advantages of the invention will be apparent from the drawings and from the detailed description of the preferred embodiment.

BRIEF DESCRIPTION OF THE DRAWINGS

A preferred embodiment of the invention is shown in the drawings in which:

FIG. 1 is a perspective view of a load cell according to the invention;

FIG. 2 is a cross sectional view of the load cell of FIG. 1 seen incorporated in an automotive steering column impact test assembly;

FIG. 3 is a cross sectional view taken on line 3—3 of FIG. 2 and including a development of the side faces of the column portion of the load cell to show strain gage placement;

FIGS. 4, 5 and 6 are circuit diagrams showing the Wheatstone Bridge arrangements for the various strain gages secured to the side face of the column portions of the load cell; and FIG. 7 is a fragmentary view in the direction of the arrows 7 in FIG. 3 under exaggerated dynamic load condition.

DETAILED DESCRIPTION OF THE PREFERRED EMBODIMENT

The invention load cell as seen in FIG. 1 includes a unitary load receiving member 10 and an insert member 12 adapted to be threadably received in the lower end of member 10. Members 10 and 12 are preferably both formed of a suitable hardened steel.

Load receiving member 10 presents, over-all, a generally cylindrical shape with the various portions arranged symmetrically about a central load cell axis Z.

Load receiving member 10 includes a generally disc shaped upper load receiving platform portion 14, a lower base portion in the form of a rim 16 having internal threads 17, and four column portions 18, 20 (FIG. 3), 22, 24 integrally and rigidly interconnecting the rim and platform portions.

Upper platform portion 14 is chamfered along its upper peripheral edge and includes a central bore 26 and a plurality of tapped bores 28 arranged in pairs circumferentially about central bore 26.

As best seen in FIG. 3, column portions 18, 20, 22, 24 are arranged circumferentially and uniformly about the load member axis Z so that each column portion is spaced 90 degrees from the next column portion and each column lies on a common circle centered on the load member axis. The column portions are square in transverse cross section and are arranged with their inner and outer faces disposed generally normal to a radius drawn to the column through the load member axis.

Insert member 12 is best seen in FIG. 2. It is generally cone shaped and includes a base portion 30 having external threads 32 for threading coaction with rim portion threads 17, a tapering intermediate portion 34, and an upper portion 36. A central bore 38 having internal splines 39 is provided in upper insert portion 36, and a tapering central counterbore 40 extends upwardly through base portion 30 and intermediate portion 34 for communication at its upper end with the lower end of splined bore 38. Insert member 12 is threaded into member 10 with insert upper portion 36 accommodated in the enlarged, tapered lower end 26a of central bore 26.

The invention load cell is seen in FIG. 2 in use as the measuring instrument in an automotive steering column impact test assembly. In FIG. 2, the invention load cell is interposed between a steering wheel 41 and a steering column shaft 42. Steering wheel 41 is seen fragmentarily in FIG. 2 and includes a central metallic hub 44 having a plurality of integral spoke arms 46, and a phenolic covering material 48 covering spoke arms 46. Hub 44 includes a central bore 52 having a lower tapered portion 54, and an upper portion 56 having internal splines 58. Steering column shaft 42 includes a main body portion 60, a tapered shank portion 62, a neck portion 64, a spline portion 66, and an upper threaded portion 68. A protective and decorative jacket 69 of usual form surrounds shaft 42. In normal automotive use, the upper end of shaft 42 is received in hub bore 52 with shaft spline portion 66 meshing in hub splines 58 and tapered shaft portion 62 seating in tapered hub bore portion 54. A nut 70 is threaded into shaft threaded portion 68 to preclude axial separation of the steering wheel and shaft.

For impact test purposes, the steering wheel and shaft are separated and the invention load cell is interposed therebetween as seen in FIG. 2. Specifically, steering wheel 41 is secured to upper platform portion 14 by a plurality of bolts 72 passing through hub 44 for threading engagement with tapped holes 28 with the lower portion 44a of the hub piloting in central bore 26 and the chamfered construction of platform portion 14 providing clearance between the upper end of the load cell and the spokes of the steering wheel. The upper end of shaft 42 is received in insert member 12 with shaft spline portion 66 meshing in insert splines 39, tapered shaft portion 62 seating in tapered insert bore portion 40, and nut 70 threaded onto shaft threaded end portion 68. Nut 70 is employed only to firmly seat shaft portion 62 in bore 40 and is removed prior to the start of the impact test.

A plurality of strain gages S are adhesively secured to the various side faces of the various column portions of unitary member 10. The various strain gages are of identical construction and may, for example, be of the type available from Micro Strain, Inc. of Spring Grove, Pa., in single form at Part No. 6A–1X1–120C and in "triplet" form as Part No. 6A–1X1–120CSI.

The orientation and distribution of the various strain gages is best seen in FIG. 3 wherein the four side faces of each column portion are shown in developed arrangement.

A "triplet" (comprising these separate strain gages in a single compound package) is secured to each radially inner and each radially outer face of each column portion, and a single gage is secured to each other face of each column portion. Thus, a triplet comprising strain gages $S_1$, $S_2$ and $S_3$ is secured to the radially outer face 18a of column portion 18, a triplet comprising strain gages $S_4$, $S_5$ and $S_6$ is secured to radially inner column face 18b, and single gages $S_7$ and $S_8$ are respectively secured to column faces 18c and 18d. Similarly, with respect to column portion 20, a triplet comprising strain gages $S_9$, $S_{10}$ and $S_{11}$ is secured to radially outer face 20a, a triplet comprising strain gages $S_{12}$, $S_{13}$ and $S_{14}$ is secured to radially inner face 20b, and single gages $S_{15}$ and $S_{16}$ are respectively secured to faces 20c and 20d. On column portion 22, a triplet comprising strain gages $S_{17}$, $S_{18}$ and $S_{19}$ is secured to radially outer face 22a, a triplet comprising strain gages $S_{20}$, $S_{21}$ and $S_{22}$ is secured to radially inner face 22b, and single gages $S_{23}$ and $S_{24}$ are respectively secured to faces 22c and 22d. On column portion 24, a triplet comprising strain gages $S_{25}$, $S_{26}$ and $S_{27}$ is secured to radially outer face 24a, a triplet comprising strain gages $S_{28}$, $S_{29}$ and $S_{30}$ is secured to radially inner face 24b, and single gages $S_{31}$ and $S_{32}$ are secured to faces 24c and 24d. Each of the strain gages in the various triplets is oriented in a direction parallel to the central load cell axis Z so as to sense strain occurring in a direction parallel to its Z axis, and each of the single strain gages is oriented in a direction normal to axis Z.

The various strain gages are selectively electrically interconnected to produce the three Wheatstone Bridge arrangements seen in FIGS. 4, 5 and 6. The Wheatstone Bridge of FIG. 4 provides a readout signal for use in measuring the impact load component in the direction of the Z axis, and the Wheatstone bridges of FIGS. 5 and 6, respectively, provide a readout signal for use in measuring the impact load components in the X and Y directions as indicated in FIG. 2.

The four arms of the Z bridge of FIG. 4 are identified as $Z_1$, $Z_2$, $Z_3$ and $Z_4$. Arm $Z_1$ comprises strain gages $S_{15}$, $S_{16}$, $S_{31}$ and $S_{32}$; arm $Z_2$ comprises gages $S_{13}$, $S_{10}$, $S_{29}$ and $S_{26}$; arm $Z_3$ comprises gages $S_{21}$, $S_{18}$, $S_5$ and $S_2$; and arm $Z_4$ comprises gages $S_{23}$, $S_{24}$, $S_7$ and $S_8$. Similarly, arm $X_1$ of the X bridge of FIG. 5 comprises gages $S_{20}$ and $S_6$; arm $X_2$ comprises gages $S_{17}$ and $S_{22}$; arm $X_3$ comprises gages $S_3$ and $S_4$; and arm $X_4$ comprises gages $S_{19}$ and $S_1$. In the Y bridge, arm $Y_1$ comprises gages $S_{12}$ and $S_{30}$; arm $Y_2$ comprises gages $S_9$ and $S_{14}$; arm $Y_3$ comprises gages $S_{27}$ and $S_{28}$; and arm $Y_4$ comprises gages $S_{11}$ and $S_{25}$.

The impact load applied to a steering wheel during a collision—and the simulated impact load applied in impact testing—is typically obliquely disposed with respect to each of the Z, Y, and X axes. Such an obliquely applied load is depicted by the load L in FIG. 1 which, as shown, has components $Z_c$, $X_c$ and $Y_c$ in each of the axial directions. The invention load cell functions to separately measure these components.

The $Z_c$ load component is measured by the Z Bridge of FIG. 4. It will be noted that bridge arm $Z_2$ contains, in series, one gage each from the inner and outer radial faces of column portion 20 and one gage each from the inner and outer radial faces of opposite column portion 24. Since the column portions compress and tend to buckle or bow outwardly in response to imposition of load L, the strain measured by opposed gages 13 and 10, for example, includes a direct stress component and a bending stress component. The bending stress component is additive with respect to one of these gages, however, and subtractive with respect to the other so that the combined signal generated by gages 13 and 10 washes out any bending component and gives an accurate, undistorted reading of direct stress. Gages 26 and 29 on column portion 24 similarly wash each other with respect to bending stress components.

Bridge arm $Z_3$ contains opposed gages $S_2$ and $S_5$ on the radially inner and outer faces of column 18 and opposed gages $S_{11}$ and $S_{21}$ on the inner and outer faces of column portion 22. Gage pairs $S_2$ and $S_5$, and $S_{18}$ and $S_{21}$, wash each other of bending stress components in the same manner as previously described with respect to the gage pairs of arm $Z_2$. The described placement of the gages of the Z bridge will be seen to provide complete polar symmetry with all extraneous bending stresses washed out to provide an extremely accurate indication of the direct stress component $Z_c$ generated by applied load L. Gages $S_{15}$, $S_{16}$, $S_{31}$ and $S_{32}$ of arm $Z_1$, and gages $S_{23}$, $S_{24}$, $S_7$ and $S_8$ of arm $Z_2$, serve only to complete the Bridge and provide temperature compensation fuction to maintain the bridge balance irrespective of ambient temperature variations.

The $Y_c$ component of load L is measured by the Y Bridge of FIG. 6. It will be noted that each of the strain gages in the Y Bridge is bonded to either pillar 20 or opposite pillar 24 and each is oriented in a direction parallel to the Z axis so that each gage senses a direct compressive stress from the $Z_c$ load component. However, since each of these gages senses essentially the same magnitude of direct stress, and since these gages are arranged two to each bridge arm, the $Z_c$ load component has no effect on the electrical balance of the Y bridge so that the readout signal obtained from the Y bridge is washed of any influence from the Z component.

The loaded configuration assumed by pillars 20 and 24, considering only the effect of the $Y_c$ component, is seen in exaggerated form in FIG. 7. The $Y_c$ component tends to displace upper load cell portion 14 in the Y direction relative to lower load cell portion 16 so that pillars 20 and 24 assume the sinuous or S configuration of FIG. 7. On column 20 this sinuous configuration generates a compressive stress in radially outer, upper gage $S_9$ and in radially inner, lower gage $S_{14}$, and generates a tensile stress in radially inner upper gage $S_{12}$ and in radially outer, lower gage $S_{11}$. In column 24, this sinuous configuration generates a compressive stress in radially inner, upper gage $S_{12}$ and in radially outer, lower gage $S_{27}$, and generates a tensile stress in radially outer, upper gage $S_{25}$ and in radially inner, lower gage $S_{30}$.

The Y gages are arranged with either two tensile stress gages or two compressive stress gages in each bridge arm and the arms are staggered in this respect so that, if one arm has two tensile gages, the two arms adjoining that arm each have two compressive gages. Thus, arm Y has two tensile gages, arm $Y_2$ has two compressive gages, arm $Y_3$ has two tensile gages, and arm $Y_4$ has two compressive gages. By placing two compressive gages (that is, gages receiving a negative stress input) in the arm adjacent to an arm having two tensile gages (that is, gages receiving a positive stress input), the signals in the four arms become additive and the total readout signal of the bridge represents the mathematical summation value, regardless of sign, of the strains sensed in all eight gages of the bridge. This arrangement amplifies the unbalance signal generated by the Y bridge and thereby increases the sensitivity and the accuracy of the bridge.

The gage pairs in each Y bridge arm comprise one gage secured to an upper end of a pillar and one gage secured to the lower end of a pillar so that any nonuniformity in loaded bending curvature as between the upper and lower ends of the pillars is washed out and does not effect the bridge balance. Whereas gage $S_9$ and $S_{14}$ of arm 42, and gages $S_{27}$ and $S_{28}$ of arm $Y_4$, are matched pairs in the sense that one member of the pair is situated on the upper end of one face of a pillar and the other member of that pair is situated on the lower end of the opposite face of that same pillar, gages $S_{12}$ and $S_{30}$ of arm $Y_1$, and gages $S_{11}$ and $S_{24}$ of arm $Y_4$, are disparate pairs in the sense that one member of the pairs is situated on the upper end of one face of a pillar and the other member of that pair is situated on the lower end of the comparable face of the other pillar. This transposition of gages in the $Y_1$ and $Y_4$ arms provides a compensatory effect when the applied Z load is eccentric with respect to the central axis of the load cell.

The X bridge of FIG. 5 will be seen to be identical in strain gage layout to the Y bridge of FIG. 6 with the exception that all of the gages in the X bridge are bonded to the inner and outer faces of opposite pillars 18 and 22. The relationship of pillar faces and upper and lower pillar locations to the bridge layout is identical in bridges X and Y, and the loaded configuration assumed by pillars 18 and 22, considering only the effect of the $X_c$ load component, is identical to the sinuous configuration illustrated in FIG. 7 with reference to the effect of the $Y_c$ component.

Although a preferred embodiment of the invention has been illustrated and described in detail, it will be apparent that various changes and modifications may be made in the disclosed embodiment without departing from the scope or spirit of the invention.

We claim:

1. A load transducer adapted to be mechanically interposed between a first test member to which a test load is to be applied and a second test member which is to absorb the test load applied to said first test member, said transducer functioning when so interposed ot measure the magnitude of said, load and comprising:
    (A) a unitary load receiving member having a central axis disposed in working position generally parallel to the direction of the received load and including
        (1) an upper load receiving platform portion symmetrically arranged about said axis,
        (2) a lower rim portion symmmetrically arranged about said axis and spaced downwardly from said platform portion, and
        (3) four column members integrally and rigidly interconnecting said rim and platform portions and arranged in circumferentially and uniformly spaced relation about said axis and generally parallel to said axis;
    (B) an insert member removably positioned within said rim portion;
    (C) connector means on said platform portion for fastening said first test member thereto;
    (D) connector means on said insert member for fastening said second test member thereto;
    (E) a first group of strain gage members including
        (1) a strain gage member oriented to sense strain occurring in a direction parallel to said axis and secured to a radially outwardly disposed face of each said column member and
        (2) another strain gage member oriented to sense strain occurring in a direction parallel to said axis and secured to a radially inwardly disposed face of each said column member; and
    (F) conductor means electrically interconnecting all of said strain gage members of said first group into a first Wheatstone bridge of which
        (1) one arm of said first Wheatstone bridge comprises in series the said outwardly and inwardly disposed strain gage members of one column member and the outwardly and inwardly disposed strain gage members of the diametrically opposed column member and
        (2) the opposite arm of said first Wheatstone bridge comprises in series the outwardly and inwardly disposed strain gage members of the two other column members.

2. A load transducer according to claim 1 wherein:
said first group of strain gage members further includes a strain gage member oriented in a direction normal to said axis and secured to the two remaining faces of each of said column members; and
the normally oriented strain gage members on one column member and the normally oriented strain gage members on the diametrically opposite column portion are electrically connected in series to constitute the third arm of said first Wheatstone bridge and the normally oriented strain gage members on the other two column members are electrically connected in series to constitute the fourth arm of said first Wheatstone bridge.

3. A load transducer according to claim 1
    (G) said four column members lying on a common circle centered on said axis with the radially inner and outer faces of each column disposed generally normal to a radius drawn to that column through said axis, said load transducer further including;
    (H) a second group of strain gage members, oriented to sense strain occurring in a direction parallel to said axis, including a strain gage member secured to the outer and inner face of one column member and to the outer and inner face of the column member diametrically opposed to said one column member;
    (I) conductor means electrically interconnecting all of the gage members of said second strain gage member group into a second Wheatstone bridge with the strain gage member of said second group secured to the outer face of a column member appearing in a bridge arm adjacent to the bridge arm containing the strain gage member of said second group secured to the inner face of that column member.

4. A load cell according to claim 3 wherein:
(J) said previously recited strain gage members of said second group are each secured to the upper end of the related column member face; and
(K) said second strain gage member group further includes a strain gage member secured to the outer and inner face of said one column member and to the outer and inner face of said opposite column member adjacent the lower end of these faces.

5. A load cell according to claim 4 wherein:
(L) with respect to both said one column member and said opposite column member, the upper and lower outer face strain gage members are disposed above and below, respectively, the strain gage member of said first group secured to that outer face.

6. A load cell according to claim 5 wherein:
(M) the upper and lower inner face strain gage members on said one column member and on said opposite column member are disposed above and below, respectively, the strain gage member of said first group secured to that inner face.

7. A load cell according to claim 4 wherein:
(L) with respect to both said one column member and said opposite column member, the strain gage member secured to the upper end of the outer face appears in the same or an opposite arm of said second Wheatstone bridge as the strain gage member secured to the lower end of the inner face and the strain gage member secured to the upper end of the inner face appears in the same or an opposite arm of said second Wheatstone bridge as the strain gage member secured to the lower end of the outer face.

8. A load cell according to claim 7 wherein:
(M) with respect to said one column member, the upper outer face gage and the lower inner face gage appear in the same bridge arm and the upper inner face gage appears in an opposite bridge arm from the lower outer face gage.

9. A load cell according to claim 8 wherein:
(N) with respect to said opposite column member, the upper inner face gage and the lower outer face gage appear in the same bridge arm and the upper outer face gage appears in an opposite bridge arm from the lower inner face gage.

10. A load transducer comprising:
(A) an upper load receiving platform member
(B) a lower base member spaced downwardly from platform portion;
(C) four column members interconnecting said platform and base portions and having a generally rectangular transverse cross section, said column members being spaced circumferentially and uniformly about, and extending generally parallel to, the central axis of said load trandsucer;
(D) a first group of strain gage members including:
(1) a strain gage member oriented to sense strain occurring in a direction parallel to said axis and secured to the radially outer face of each said column member and
(2) a strain gage member oriented to sense strain occurring in a direction parallel to said axis and secured to the radially inner face of each said column member, and
(E) conductor means electrically interconnecting all of said strain gage members of said first group of strain gage members into a first Wheatstone bridge of which
(1) one arm of said first Wheatstone bridge comprises, in series, the inner and outer strain gages of one column member and the inner and outer strain gages of the diametrically opposed column member; and
(2) the opposite arm of said first Wheatstone bridge comprises, in series, the inner and outer strain gages of the two other column members.

11. A load transducer according to claim 10 wherein:
(F) said first group of strain gage members further includes a strain gage member oriented in a direction normal to said axis secured to the two remaining faces of each of said column members; and
(G) the normally oriented strain gage members on one column member and the normally oriented strain gage members on the diametrically opposite column portion being electrically connected in series to constitute the third arm of said first Wheatstone bridge and the normally oriented strain gage members on the other two column members being electrically connected in series to constitute the fourth arm of said first Wheatstone bridge.

References Cited

UNITED STATES PATENTS

| | | | |
|---|---|---|---|
| 2,439,146 | 4/1948 | Ruge | 73—141 |
| 2,488,348 | 11/1949 | Ruge | 73—141 X |
| 2,498,881 | 2/1950 | Eldridge, Jr. | 73—133 |
| 3,427,875 | 2/1969 | Saxl | 73—141 |
| 3,492,864 | 2/1970 | Kraeling et al. | 73—141 X |

FOREIGN PATENTS

| | | | |
|---|---|---|---|
| 790,057 | 2/1950 | Great Britain | 73—140 |
| 46,669 | 2/1963 | Poland | 73—133 |

CHARLES A. RUEHL, Primary Examiner

U.S. Cl. X.R.

73—141 A